United States Patent Office 3,836,463
Patented Sept. 17, 1974

3,836,463
SYSTEM AND APPARATUS FOR CLEANING BAR GRID
Roger W. Teague and Richard Paul Snyder, Largo, Fla., assignors to General Signal Corporation
Filed July 28, 1972, Ser. No. 275,914
Int. Cl. B01d 33/00
U.S. Cl. 210—162                     8 Claims

ABSTRACT OF THE DISCLOSURE

An automatic rake is provided for a bar grid which bar grid is mounted in a flume adjacent a waste disintegrator. The rake is preferably provided with a plurality of fingers extending between the bars of the grid and is reciprocated by a motor and is provided with a second motor member which is adapted to lift the rake away from the bar grid if an obstruction is met. Automatic means are provided so that when the obstruction is sensed, the rake will reverse itself and go to the bottom of the grid again. The arrangement is such in combination with a waste disintegrator that the material from the grid will be raked into the path of the disintegrator to be pulverized therein.

BACKGROUND OF THE INVENTION

In primary treatment of waste water there takes place essentially a liquid/solid separation which is accomplished by screening. Screenings will remove coarse solids and are generally formed by placing a plurality of bars in parallel in the form of a rack, and these racks are either hand or mechanically raked. The screen grid needs to be of such dimensions and configurations that undesirable accumulations do not occur thereon since a head loss will take place in the flume channel feeding the bar grid. The bar grids are therefore usually cleaned by the use of rakes that are operated either by hand or mechanically. The mechanical rakes suffer primarily from the problem that if the rake is placed on the face of the screen the mechanism quite frequently forces the tines of the rake to penetrate the debris and if the tines strike a particularly heavy piece, they quite often can become damaged. It also has become common to remove the material from a bar grid into some form of a collector such as a gutter belt conveyor, hopper car, or the like, but as can be seen this involves more transport of the debris material which must eventually be comminuted. It therefore was more practical to associate a bar grid with a single faced grinder or disintegrator which utilizes flow for the grinding process and to discharge the material into this flow path to the face of a disintegrator.

SUMMARY OF THE INVENTION

The present invention permits the use of a mechanical rake oriented on the face of a bar grid, which bar grid is inclined to the flow that aids in the reciprocation of the rake up and down the face of the bar grid. The reciprocation of the rake is provided by a motor means that is attached thereto and a second motor which positions the rake in contact with the bar grid or lifted therefrom. At the lower end of the bar grid the rake will lie against the grid with its tines in between the spaces and will move itself upwardly on the incline delivering the debris over the end of the bar grid into the path of the disintegrator which is arranged in the flume to receive a portion of the direct flow. A second motor will then lift the rake and permit it to return to the bottom of its stroke out of contact with the bar grid. Should, for example, the rake on the upward stroke reach an obstruction, means associated with the motor will sense the overload and lift the rake from contact with the bar grid and return it to the bottom of the stroke to begin the cycle all over again. When this type of apparatus is used together with a waste disintegrator or comminutor, the material may be ground up in the waste disintegrator, being broken up into fragments small enough so that they may safely pass through the plant. In the preferred form of bar grid or screen, the flume may be divided in such a way that direct flow is provided to impinge upon the waste disintegrator and side flow is directed towards the bar screens which may be mounted effectively inside diverting channels and there may be one or more with this orientation. In this manner of arrangement direct flow is insured against the waste disintegrator which is necessary for its proper operation since it is a single face grinder.

DESCRIPTION OF THE PREFERRED EMBODIMENT

Figure 1:
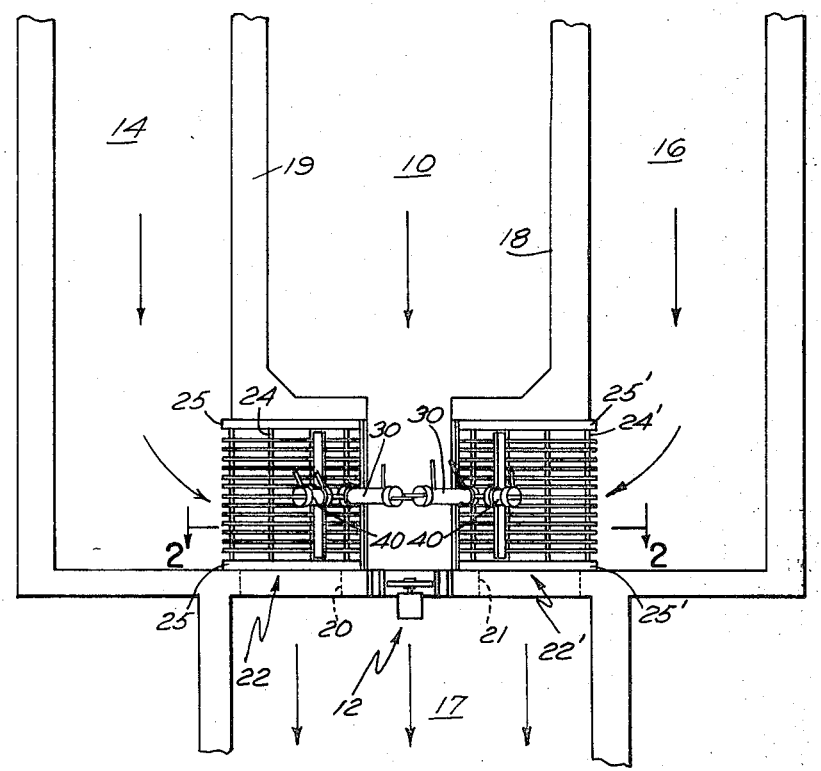
FIG. 1 is a plan view of a preferred form of system employing bar grids located in a flume with diversion channels.

The system as a whole is best illustrated in FIG. 1 where in plan the main flow channel is shown as divided into three channels, there being a direct impingement channel 10 that leads directly to a disintegrator generally designated 12 and a pair of side channels 14 and 16, all of which discharge into channel 17. The channels are formed by concrete walls 18 and 19 which direct the flow as shown substantially by the arrows, channels 14 and 16 discharging through openings 20, 21. Bar grid generally designated 22 and 22' are located in channels 14 and 16 and comprise a plurality of spaced longitudinally extending bars 23, 23' which are secured to a plurality of transverse members 24, 24' that are in turn welded to frames 25, 25'.

Figure 4:
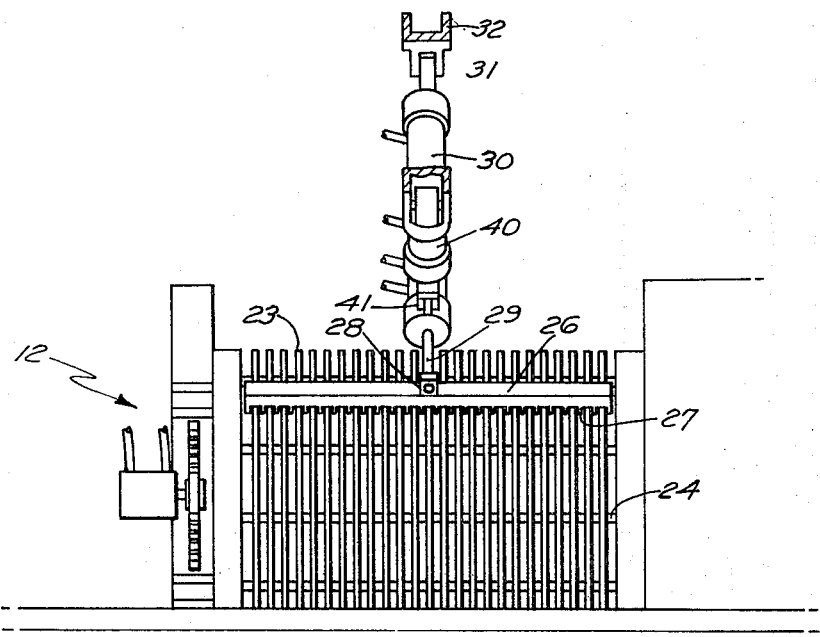
FIG. 4 is an end view in elevation looking at one of the bar grids.

The bar grid cleaning mechanism is shown in FIG. 4 as comprising a rake member 26 which has a plurality of fingers 27 that extend downwardly between the bars 23 centrally of the rake 26. At 28, there is affixed a motor means in the form of a piston rod 29 extending from a hydraulic double acting cylinder 30. The motor 30 is mounted as at 31 to a support framework 32 which framework can be made up of a number of metal channels that are mounted in the flume in suitable manner adjacent the waste disintegrator. The second motor 40 is provided and this motor is pivotally mounted on the lower end of the motor 30 as at 41. It is illustrated as being a double acting hydraulic cylinder whose other end is pivotally mounted to a portion of the support frame 32 as at 42.

Figure 5:
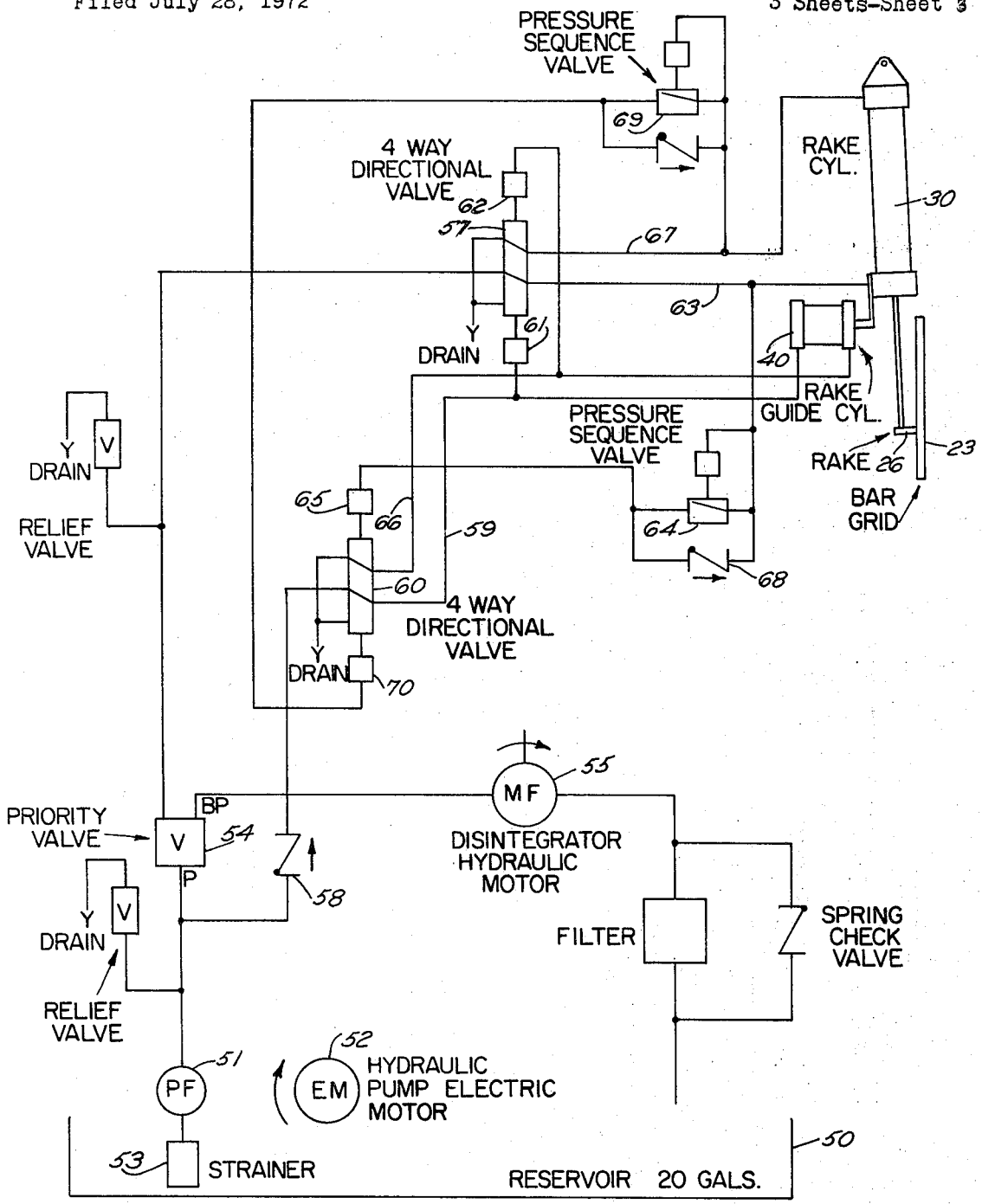
FIG. 5 is a hydraulic schematic diagram showing the manner in which the system operates.

To understand how the system operates, reference should be had to FIG. 5 where the hydraulic circuit is illustrated in diagrammatic form. Basically it will be seen that there is a hydraulic reservoir 50 with the main hydraulic pump 51 driven by an electric motor 52. The hydraulic pump takes its supply through a strainer 53 and delivers it to a diversion or priority valve 54, one output of which has a lead to a hydraulic motor 55. The other output leads to a four-way directional valve 57. Another output from the pressure pump 51 moves through check valve 58 to a differential pressure operated four-way valve 60. Valve 60 feeds hydraulic fluid to the hydraulic motor 40 which serves to position the rake either away from or against the bar grid and in addition this four-way valve 60 will operate differential pressure operated four-way valve 57. As shown in the diagram, pressure applied through valve 60 will cause the motor 40 to operate to a position where the rake engages the bar grid. When the piston in the motor 40 reaches the end of its stroke, pressure will rise in hydraulic line 59 and be applied to operator 61 moving the valve 57 to the position as shown in the diagram and apply pressure to the lower end of the rake motor 30 causing the rake to move upwardly as shown in the drawing. When the rake reaches the top of the stroke, or in the alternate if debris on the rake jams the scraper before it reaches the top of the stroke, pressure in the hydraulic line 63 will rise going to a maximum value and pressure sequence valve 64 will operate which will now allow hydraulic pressure to reach the operator 65 reversing four-way valve 60. When this occurs, hydraulic pressure is now fed out over line 66 which will now apply pressure to hydraulic motor 40 causing the rake to rise away from the bar grid. When the motor 40 has moved to its extreme position, pressure will rise and cause operator 62 to move valve 57 to a position to supply hydraulic pressure over line 67 to the top of rake cylinder 30 causing the rake now to move downwardly. At the same time the pressure that was applied to the sequence valve 64 will now drop since line 63 is connected to a drain and further the pressure on the operator 65 will drop leading through check valve 68. When the rake reaches the bottom of the stroke, the pressure in the hydraulic line 67 will rise going to a maximum value and this will operate pressure sequence valve 69 which will now apply pressure to operator 70 which will operate four-way valve 60 back to the direction as shown in the drawing applying pressure to the rake guide cylinder to cause the rake to engage the bar grid and the cycle will now repeat itself.

Figure 2:
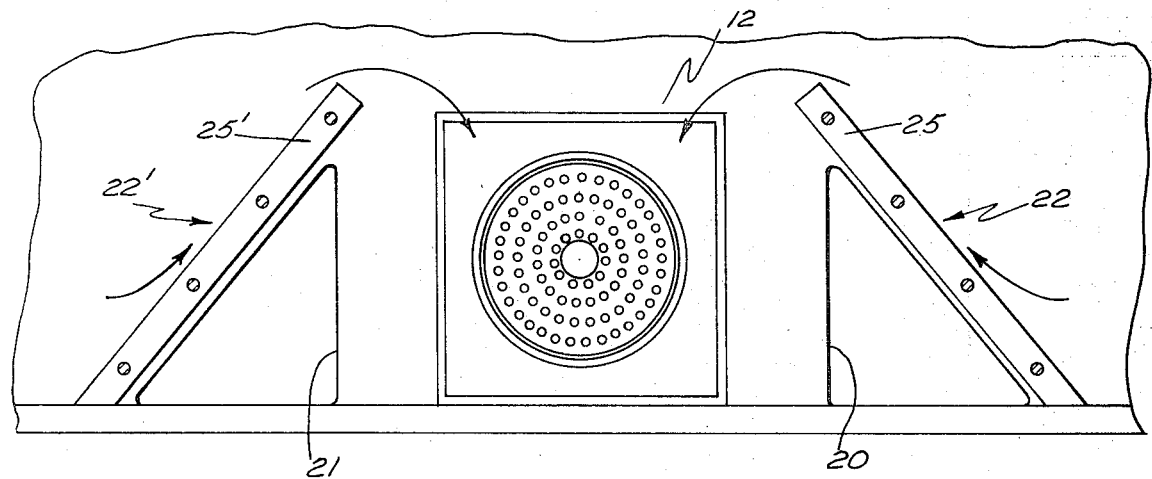
FIG. 2 is a sectional view taken substantially on lines 2—2 of FIG. 1 with parts omitted for clarity and showing particularly the flow pattern of the solids.
Figure 3:
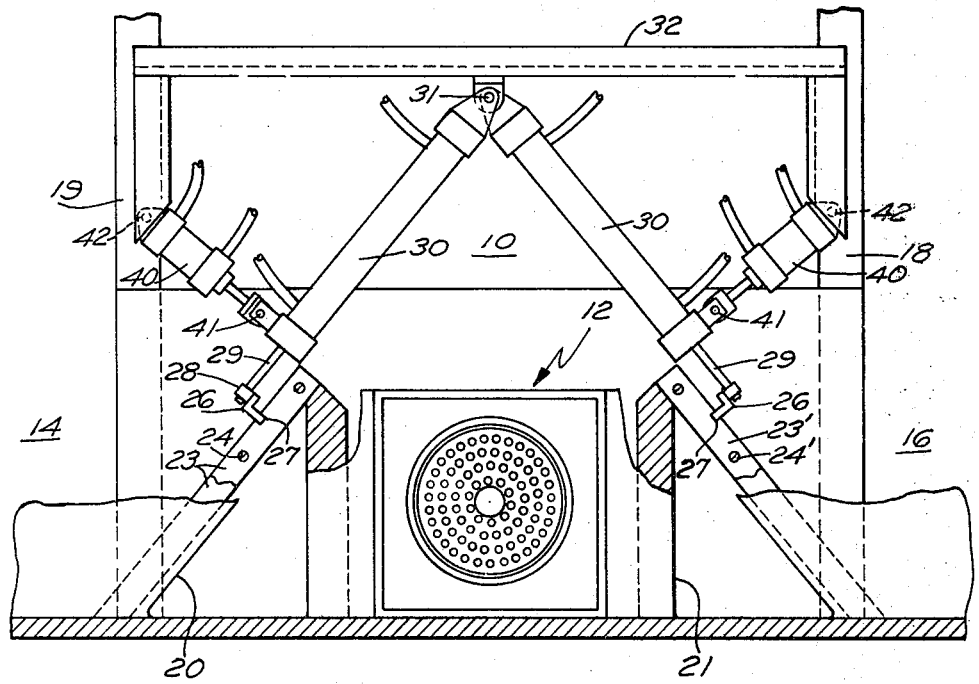
FIG. 3 is an end elevational view partly broken away of FIG. 1 showing the cleaning system for the bar grid.

From the foregoing it will appear that there has been provided a means for cleaning bar grids by removing debris therefrom and depositing it in the face of a disintegrator which is being fed preferably with partial direct flow from the flume. The debris is then minced or comminuted which reduces the size of the retained particles and maintains them in the waste water flow. The rake operating system is also arranged in such a way that if it meets an obstruction the rake will automatically return to the bottom of the grid to re-cycle in an upward stroke so that it will eventually pull the debris to the top of the grid and deposit it in front of the disintegrator. The rate of frequency at which the rake is reciprocated may be varied but will ordinarily be on the order of three times per minute. The bar grids are preferably sloped as shown in FIGS. 2 and 3 and will ordinarily be at an angle of from 30° to 60° with respect to the horizontal.

We claim:

1. An automatic cleaning mechanism for removing debris from a flume grid, said mechanism comprising a support means constructed and arranged in overlying relationship to a grid to be cleaned and also comprising a rake means arranged to extend across the width of the grid and arranged for reciprocatory movement from the lower portion of said grid to the upper portion thereof, a first motor means with a piston and cylinder arranged to move said rake means reciprocatingly from the lower portion of said grid to the upper portion thereof, a second motor means with a piston and a cylinder connected to said support means and arranged in overlying relationship to said grid, said second motor means being arranged to lift said rake means from a position on the surface of said grid to a position above the surface of said grid, the cylinder end of said second fluid motor being connected to the support means and wherein the piston member of said first motor means carries said rake and the piston member of said second motor means is connected to said first motor means, power means for operating said motors, sensing means connected to said first motor means for sensing an increased load on said first motor means when an obstruction is encountered by said rake means, said sensing means further being connected to said second motor means to cause said second motor means to lift said rake means away from the surface of said grid when said sensing means responds to said increased load from an obstruction on said grid to the upward movement of said rake means by said first motor means.

2. An automatic cleaning mechanism in accordance with claim 1 wherein said first and second motor means comprise fluid motors.

3. An automatic cleaning mechanism in accordance with claim 1 wherein said first and second fluid motors comprise piston members carried in cylinders adapted to receive fluid in either side of said cylinders.

4. An automatic cleaning mechanism in accordance with claim 1 wherein said power means includes means for periodically actuating said first and second motor means.

5. An automatic cleaning mechanism in accordance with claim 4 wherein said first and second motor means each include a piston and cylinder and wherein the actuating for said motors includes valves.

6. An automatic cleaning mechanism in accordance with claim 5 wherein one of said valves is operative to return said rake to said lower portion of said grid when it senses a pressure buildup in said first motor means as said rake impinges on an obstruction in said grid.

7. In a mechanism in accordance with claim 1 wherein said motor means are periodically actuated by valve means including a pressure responsive valve that causes said motor means to return said rake to said lower portion of said grid if said rake impinges on an obstruction on said grid it cannot move.

8. An automatic rake as in claim 1 wherein the grid is inclined to the direction of flow.

References Cited

UNITED STATES PATENTS

| | | | |
|---|---|---|---|
| 2,897,967 | 8/1959 | Arthur | 210—159 X |
| 2,200,392 | 5/1940 | Goldberg | 254—93 R |
| 2,483,239 | 9/1949 | Sharpe | 254—93 R |
| 3,689,030 | 9/1972 | Backus | 254—93 R |
| 2,866,555 | 12/1958 | Nordell | 210—159 X |
| 2,839,197 | 6/1958 | Nordell | 210—162 X |
| 1,536,961 | 5/1925 | McMillan | 210—162 |

OTHER REFERENCES

Chicago "Barminutor," Bul. 186-B, pp. 2-9, 1957, Chicago Pump Co., Chicago, Ill.

THEODORE A. GRANGER, Primary Examiner